United States Patent

Braden et al.

[11] Patent Number: 5,911,503
[45] Date of Patent: Jun. 15, 1999

[54] CHEMICAL REACTOR WITH MAGNETIC STIRRING DEVICE

[75] Inventors: Christoph Braden, Köln; Ralf Dohrn, Bergisch Gladbach, both of Germany

[73] Assignee: Bayer Aktiengesellschaft, Leverkusen, Germany

[21] Appl. No.: 08/837,075

[22] Filed: Apr. 11, 1997

[30] Foreign Application Priority Data

Apr. 17, 1996 [DE] Germany ............................ 196 15 117

[51] Int. Cl.⁶ .................................................. B01F 13/08
[52] U.S. Cl. ............................................ 366/143; 366/273
[58] Field of Search .................................. 366/143, 273, 366/274, 349; 416/3

[56] References Cited

U.S. PATENT DOCUMENTS

| | | |
|---|---|---|
| 3,219,318 | 11/1965 | Hershler . |
| 3,689,033 | 9/1972 | Holmstrom et al. ..................... 366/273 |
| 4,131,370 | 12/1978 | Lawrence et al. . |
| 4,199,265 | 4/1980 | Sanderson et al. ..................... 366/274 |
| 4,477,192 | 10/1984 | Bonney .................................... 366/274 |
| 4,752,138 | 6/1988 | Rufer ....................................... 366/274 |
| 5,478,149 | 12/1995 | Quigg . |
| 5,529,391 | 6/1996 | Kindman et al. .................... 366/274 X |

FOREIGN PATENT DOCUMENTS

| | | | |
|---|---|---|---|
| 275985 | 2/1990 | German Dem. Rep. .............. 366/273 |
| 293504 | 9/1991 | German Dem. Rep. . |
| 63-107737 | 5/1988 | Japan ..................................... 366/273 |
| 64-51131 | 2/1989 | Japan ..................................... 366/273 |
| 1-199637 | 8/1989 | Japan ..................................... 366/273 |
| 919723 | 4/1982 | U.S.S.R. ................................. 366/273 |

*Primary Examiner*—Charles E. Cooley
*Attorney, Agent, or Firm*—Sprung Kramer Schaefer & Briscoe

[57] ABSTRACT

The chemical reactor is based on a cylindrical vessel with a stirring device. The stirring device consists of a magnetic stirrer 3, 5, 11a, 11b, 12 with magnetic coils which are disposed around the outside of the cylindrical vessel 1 in the form of a star and produce a magnetic field and of a rotor 3 which is mounted in the region of the rotating field in the vessel 1 such that it can rotate about the cylinder axis. The rotor is provided with stirring blades 11a, 11b, 12 and comprises permanent magnets 5 co-operating with the rotating field.

3 Claims, 4 Drawing Sheets

CHEMICAL REACTOR WITH MAGNETIC STIRRING DEVICE

BACKGROUND OF THE INVENTION

The contents of chemical reactors may be intermixed by means of stirrers whose drive for the stirring device is mounted outside of the reactor vessel. Torque is transmitted from the motor to the stirrer by means of a shaft which passes through the vessel wall. The shaft may be sealed by a gland. The gland gives rise to problems regarding tightness, so that so-called glandless stirring devices (motor-driven magnetically-coupled stirrers) are frequently used at pressures of <5 MPa. In this case the shaft of the stirring device is surrounded by a tube which is closed on one side. The open tube end is connected to the high-pressure reactor. Permanent magnets are mounted on the part of the stirring shaft which is disposed in the tube outside of the reactor. A cylindrical part is secured such that it can rotate about the tube and also has magnets mounted on its inside. A motor drives the cylindrical part. Torque is transmitted via the magnets through the tube to the stirrer shaft. The space between the tube and the stirrer shaft is filled with the medium contained in the high-pressure reactor. It represents a dead space in which deposits, secondary reactions and unintended phase transitions (e.g. condensation) may occur. Uniform temperature regulation of the content of the high-pressure reactor is made more difficult by this dead space.

Another possible way of mixing the contents of a reactor lies in using a motor-free, magnetically-coupled stirrer at the end face of a cylindrical reactor (cf. U.S. Pat. No. 4,199, 265). A bar magnet serves as a stirring fish which rotates unmounted in the reactor, with a rotating magnetic field being produced by a plurality of electromagnets mounted outside the reactor on the end face. One disadvantage of using a stirrer of this kind in a high-pressure reactor with a window lies in the fact that one end face of the vessel is occupied and not available for a window which covers the entire cross section of the reactor. In this connection it must be borne in mind that the second end face is usually required for a bellows or for a second window (e.g. for light irradiation). Another disadvantage lies in the fact that the bar magnet serving as a stirrer is not mounted. This means that the bar magnet may take up a position in which it is no longer within the bounds of the rotating magnetic field. The bar magnet also makes it impossible to obtain an unhampered view along the longitudinal axis of the reactor, and this represents a serious limitation for the observation of phase transitions and critical points.

The object of the invention is to develop a reactor for chemical reactions which has the following features:

1. It should be possible to inspect the entire cell interior of the reactor through at least one visual observation window in order to be able to observe phase changes and critical points while a reaction is taking place. The stirrer must in this respect be formed such that each location in the cell can be observed, at least over a period of time.
2. Satisfactory intermixing is a necessity for the entire interior.
3. There should not be any dead spaces in which deposits or condensation may occur.

A motor-driven stirring device inevitably has dead spaces. A motor-free stirring device cannot be provided at an end face on account of the fact that one end face, which is required for the window, is occupied. A non-mounted stirring fish may settle and obstruct the longitudinal axis of the cell. It is for these reasons that the chemical industry requires an improved high-pressure reactor with a magnetic stirrer which meets the above requirements.

SUMMARY OF THE INVENTION

This object is solved according to the invention in that the stirring device consists of a magnetic stirrer with magnetic coils which are disposed around the outside of the cylindrical reactor vessel in the form of a star and produce a magnetic field and of a rotor which is mounted in the region of the rotating field in the vessel such that it can rotate about the cylinder axis, is provided with stirring blades and bears permanent magnets co-operating with the rotating field.

The rotor preferably consists of a concentric ring or tubular piece at the outer circumference of which at least two permanent magnets, which produce a radial field, are disposed, so that the region lying within the ring or tubular piece remains free for observation purposes.

If a flow is to be produced in the axial direction in the reactor, the stirring blades must be positioned at a slant to the axis. The magnetic stirring device is then self-feeding.

According to a development of the invention the reactor is formed as a measuring cell for spectroscopic analyses and for this purpose the measuring light is transmitted through it in the axial direction.

The invention provides the following advantages:
  No dead spaces are introduced into the reactor by the stirring device.
  By forming the rotor as a ring or tubular piece which is concentric with the vessel wall, it is possible to achieve an unobstructed view or transmission through the reactor interior for measurement and observation purposes.
  There is a reduction in the overall number of seals required, so that there are fewer sealing problems.
  On account of the simple and sturdy structure, the time expended on assembling, dismantling and cleaning the reactor can be reduced.
  Improved temperature regulation is also possible on account of the relatively simple reactor cell geometry.

BRIEF DESCRIPTION OF THE DRAWINGS

The invention is explained in detail in the following on the basis of an embodiment represented in the drawings, in which.

Figure 1:
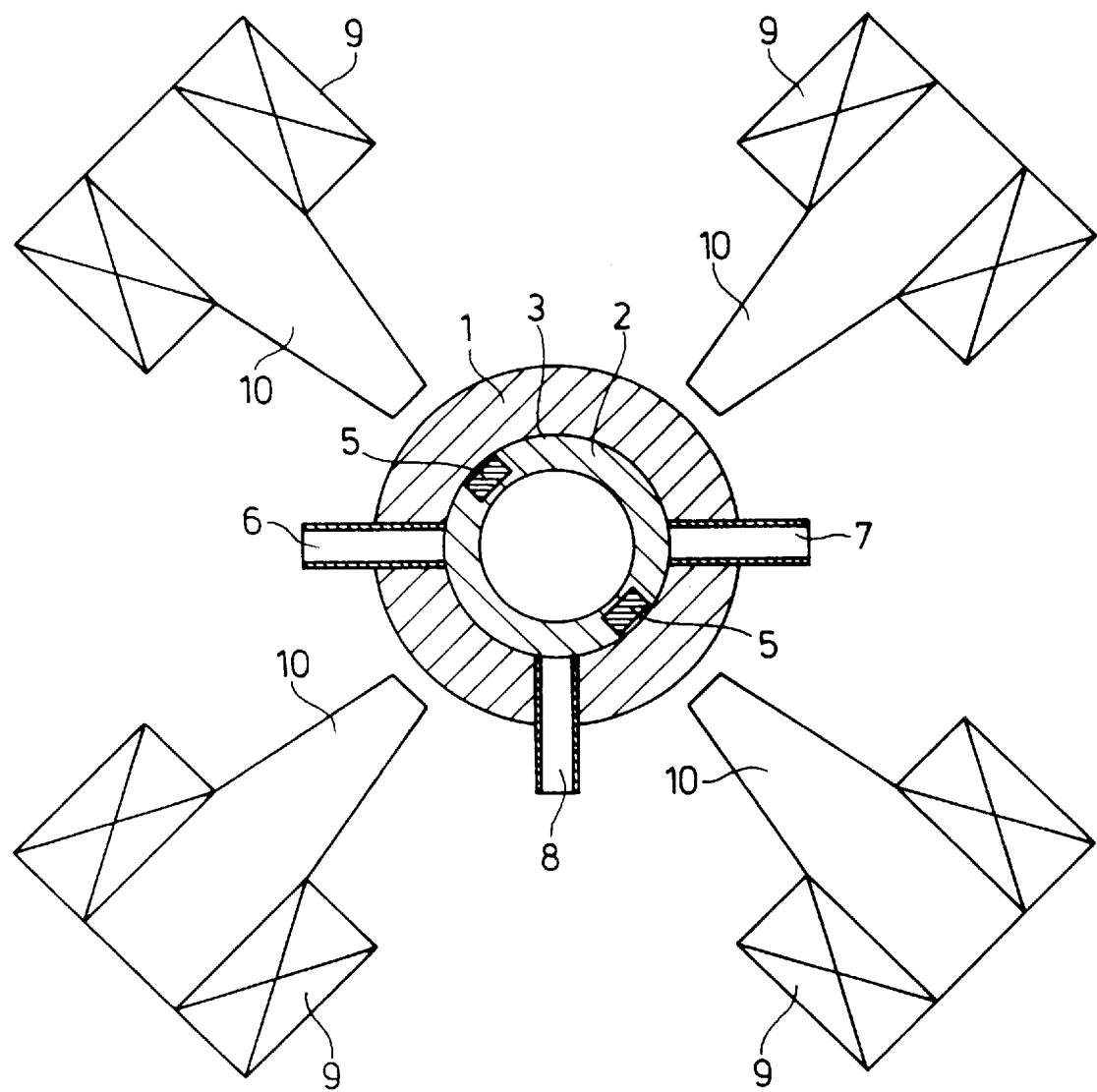
FIG. 1 is a cross section through the reactor with the rotor and the external magnetic coils (electromagnets)
Figure 2:
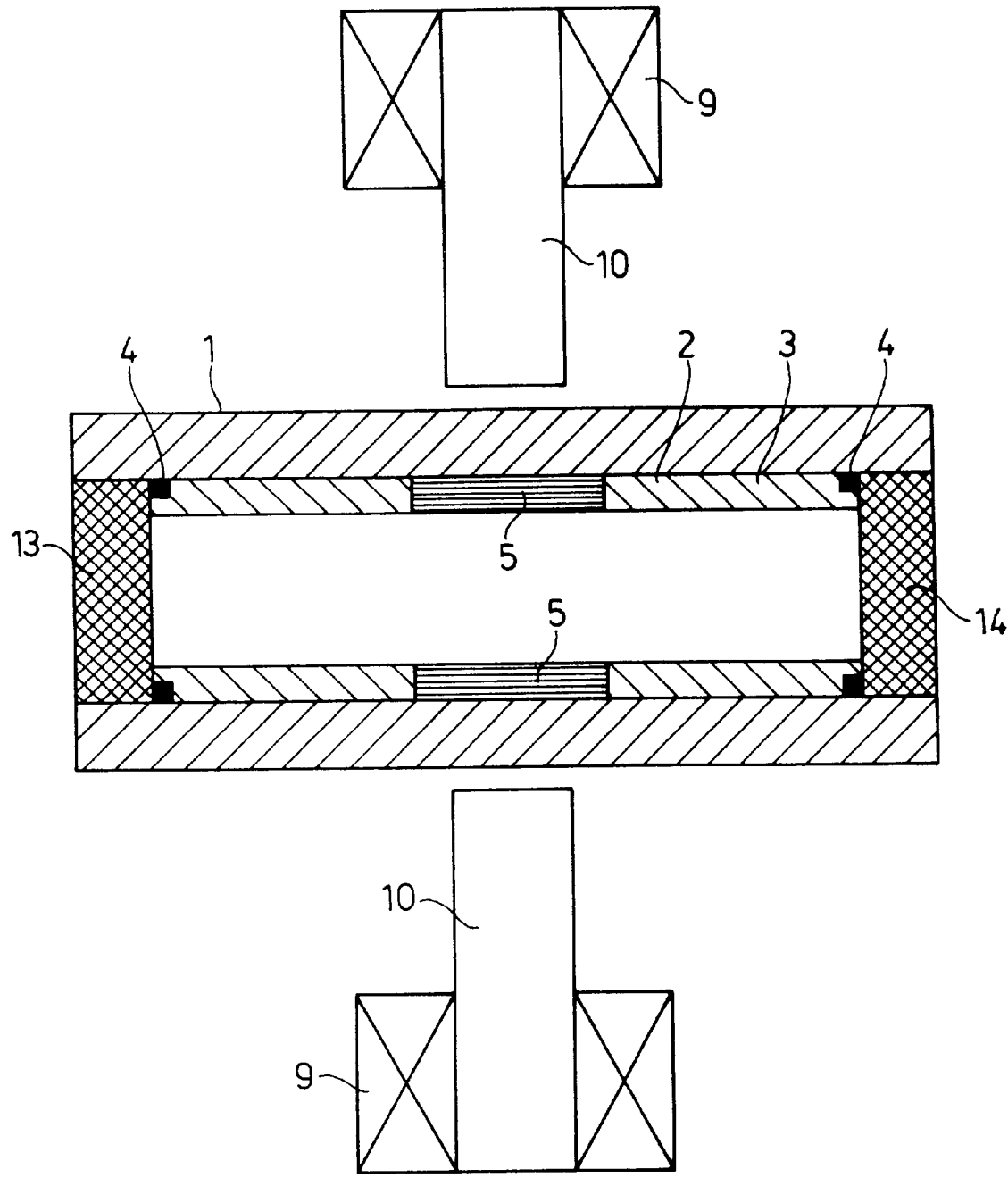
FIG. 2 is a longitudinal section through the reactor with the rotor mounting

The reactor according to FIGS. 1 and 2 consists of a cylindrical, pressure-resistant vessel 1, in which a rotor 3 consisting of a ring or tubular piece 2 is rotatably mounted concentrically with the vessel wall. For this purpose the inner vessel wall is provided with bearing bushes 4 (see FIG. 2). The rotor 3 bears a plurality of symmetrically disposed permanent magnets 5, the pole faces of which are directed inwards and outwards. The vessel wall consists of a non-magnetic material, e.g. of high-grade steel V2A or V4A, of Hastelloy, a ceramic material or glass. The reactor is provided with connections 6 and 7 for supplying reactands and with another connection 8 for removing or discharging the reaction product. If the reaction is only to take place in batch mode, it is sufficient just to provide the connections 6 and 7. The inlet connections 6 and 7 and outlet connection 8 communicate with the interior region of the rotor 3 through apertures in the rotor (not shown).

A rotating magnetic field which entrains the rotor 3 with the permanent magnets 5 and thereby causes it to rotate is produced by means of magnetic coils 9 disposed in the form of a star around the vessel 1. The magnetic field of the coils 9 is focussed and concentrated on the permanent magnets 5 by the pole shoes 10. The electric currents for energising the magnetic coils 9 in the correct phase are produced by a known control circuit (not shown). The control circuit can make the rotor 3 rotate regularly or irregularly or hold it still in a defined position.

Figure 3A:
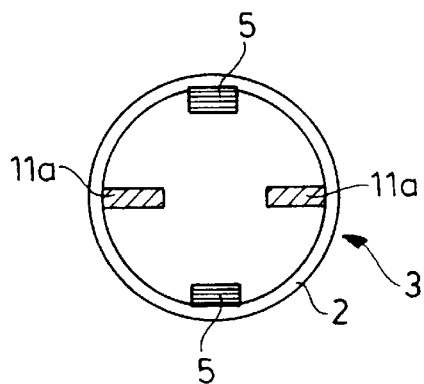
FIGS. 3a–3d show various constructions for the stirring blades on the rotor.
Figure 3C:
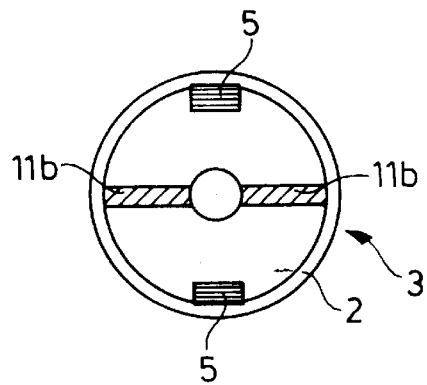
Figure 3B:
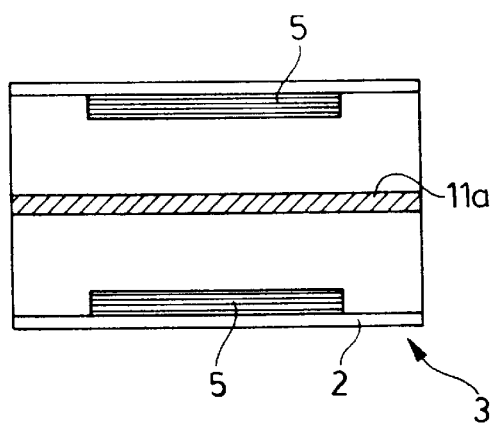
Figure 3D:
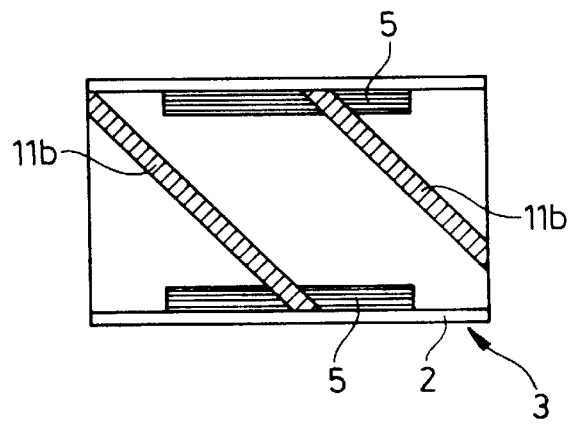

As shown in FIGS. 3a–3d, the rotor 3 is fitted with stirring blades 11a, 11b to intermix the reactor contents. FIGS. 3a and 3c each show a cross section (perpendicularly to the axis) and FIGS. 3b and 3d a longitudinal section (parallel to the axis) through the rotor. According to FIGS. 3a and 3b the stirring blades 11a consist of short bars or paddles which extend inwards in the radial direction from the inner rotor wall, while the stirring blades 11b according to FIGS. 3c and 3d consist of stirring surfaces which are positioned at a slant to the axis and disposed in the form of a spiral at the rotor wall. When the rotor rotates the stirring surfaces 11b execute a tumbling motion. In addition to the intermixing, this results in the reaction mixture being fed alone the axis. The magnetic stirring device therefore simultaneously acts as a feed pump in this construction.

Figure 4A:
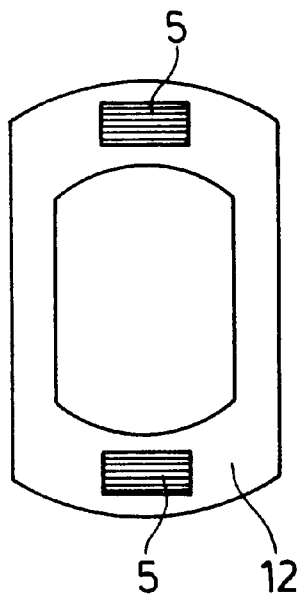
FIGS. 4a–4b show further rotor constructions with different permanent magnet arrangements.
Figure 4B:
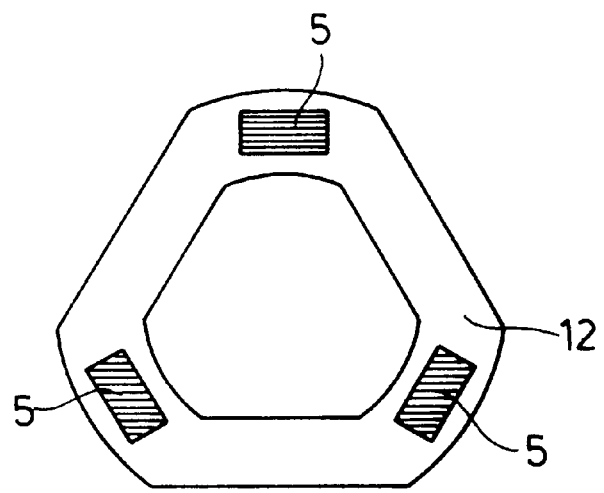

According to FIGS. 4a and 4b the stirring blades are formed as sector-shaped laminae 12, at the outer ends of which the permanent magnets 5 are mounted. Two (FIG. 4a), three (FIG. 4b) or more stirring laminae 12 disposed in the form of a star may be fitted.

As shown in FIGS. 4a and 4b, the rotors depicted are designed in the form of sector shaped blades, and carry the permanent magnets (5) and at the same time perform the stirring function. The rotors of FIGS. 4a 4b combine the rotor and the blades into a single construction that serves both purposes. The shape of the rotor causes the stirring as it rotates.

In this case an important construction feature of the reactor lies in the fact that the reactor interior remains free from fittings in the vicinity of the axis, so that the central reactor space is accessible for observation purposes or optical measurements. The reactor is therefore provided with visual observation windows 13 and 14 at its end faces. The reactor may then, for example, be installed in transmission in a spectrometer as an on-line measuring cell, so that spectroscopic analyses of chemical reactions can be carried out while these are taking place.

We claim:

1. A reactor for chemical reactions at operating pressures of <5 bar, comprising a cylindrical vessel (1) having a magnetic stirrer (3, 5, 11a, 11b, 12) with magnetic coils (9) disposed around the outside of the cylindrical vessel and which produce a magnetic field within the reactor, the magnetic stirrer being designed as a concentric ring or tubular piece (2) within the vessel and which is rotatable about the central axis of the vessel, said concentric ring or tubular piece (2) having permanent magnets mounted on its outer circumference and being provided with stirring blades, and being disposed so that the region lying within the ring or tubular piece (2) remains free for observation purposes.

2. Reactor according to claim 1, wherein the stirring blades (11b) are positioned at a slant to the axis to produce an axial flow.

3. Reactor according to claim 1, wherein the reactor is constructed as a measuring cell, with windows for spectroscopic analysis and measuring light for spectroscopic analysis of the reactor contents is transmitted through the reactor in the axial direction.

* * * * *